June 5, 1951            H. SEIDMAN            2,555,904
RETAINING CLIP FOR FINGER RING PAIRS
Filed May 17, 1949
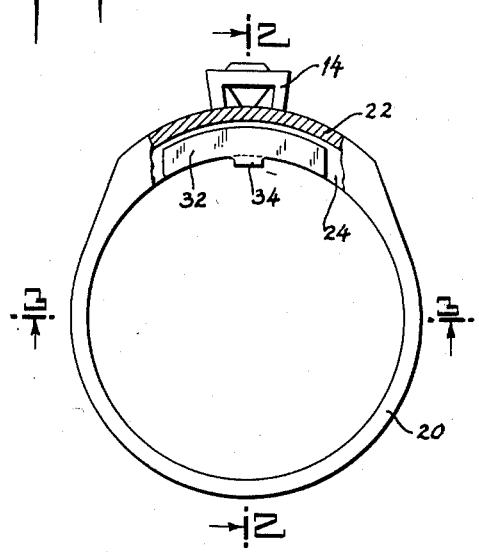
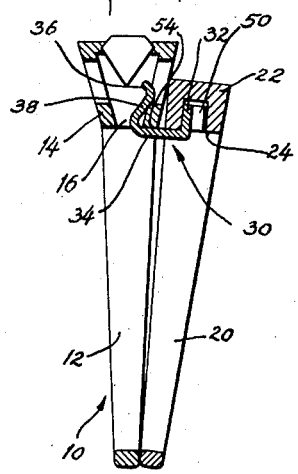
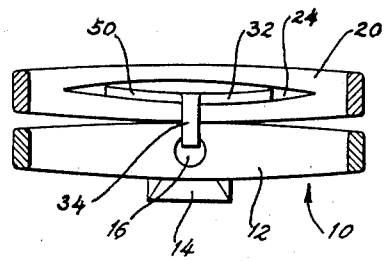
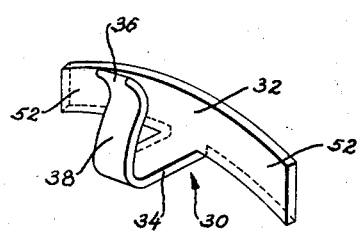
INVENTOR.
HYMAN SEIDMAN.
BY
Schainer & Lieberman
Attorneys Patented June 5, 1951

2,555,904

UNITED STATES PATENT OFFICE 2,555,904

RETAINING CLIP FOR FINGER RING PAIRS

Hyman Seidman, New York, N. Y.

Application May 17, 1949, Serial No. 93,676

2 Claims. (Cl. 63—16)

The present invention relates to finger rings generally and, in particular, it relates to finger rings with gem settings thereon. Even more particularly, the present invention relates to finger rings having gem settings thereon which rings are to be worn in pairs, as for example an engagement ring and a wedding ring.

In wearing finger ring pairs, as engagement rings and wedding rings, both of which conventionally have precious or semi-precious stones set therein, it is, of course, extremely desirable that the rings be so positioned as to present the gem settings on the outer aspect of the hand, not only to display the gems to best advantage, but also to keep the gem settings from interfering with the movements of the fingers, as would happen if the rings turned on the fingers and the gem settings slip around to the sides of the fingers, rather than the back thereof. However, unless held together, it all too often happens that one ring or another will shift around the ring finger to the side thereof which not only is unsightly but also interferes with the free movement of the fingers.

Various expedients have been attempted in the past to hold paired finger rings together, but in almost every expedient attempted in the past either the rings have to be altered materially, or the rings must otherwise be of special construction, or the gripping or clamping member is readily visible and interferes with the wearing of the rings per se. All of these defects of prior constructions have, I believe, been overcome by my invention, the main object of which is the provision of a clip for holding a pair of finger rings together, which clip will not interfere with the ordinary use and wearing of the ring, which is invisible when in holding position, and which is positive in operation.

Another object of the present invention is the provision of a clip or lock for holding two rings together, which comprises a generally U-shaped spring member, one leg of which is fitted into the gem setting socket of one ring and the other leg of which fits into the gem setting socket of the other ring, whereby the rings are spring pressed together.

Another object of the present invention is the provision of the device of the character described which comprises an elongated vertical rib which fits within the stone setting of one ring and which has an offset spring finger to fit into the stone setting of the adjacently disposed ring, for locking the two rings together.

Other and further objects of the present invention will, in part, be specifically pointed out hereinbelow in connection with the following description of several illustrative embodiments thereof, and still others will be obvious from the following specification.

In the drawings annexed hereto and forming a part thereof,

Figure 1 is a side elevational view partly in section of a pair of finger rings held together by one form of device constructed according to and embodying my invention;

Figure 2 is a vertical section on the line 2—2 of Figure 1;

Figure 3 is a section on the line 3—3 of Figure 1; and

Figure 4 is a perspective view of a modified form of device also constructed according to and embodying the present invention.

In the drawings, the engagement ring is indicated by reference numeral 10, comprising a circlet 12 at the top of which is the gem setting 14, hollowed lengthwise of the circlet as indicated at 16. This structure is quite conventional in engagement rings, that is, the provision of a gem setting atop the ring, which setting is hollowed at the underside thereof. Conventional wedding rings, as 20, are now provided with one or more gem settings, as 22, at the top thereof, which settings 22 are also hollowed at the underside thereof, as indicated at 24. Wedding rings are now provided with gem settings of some extent, as indicated at 24, and the device of the present invention is particularly applicable to ring pairs of this general construction, although with some little modification, it may be used with other finger ring structures.

The clip formed according to the present invention is indicated generally by reference numeral 30, and is preferably formed of thin-section springy material, metallic or otherwise, and comprises an elongated rib 32 as one portion thereof. As seen in side elevation in Figure 1 and as seen in Figure 4, rib 32 is longitudinally curved substantially along the curvature of the ring. Rib 32 is preferably shorter than the length of the gem setting opening, as 24, in the engagement ring 20, and its height is limited by the depth of the opening 24. Connected to rib 32 by a transverse bridging bar 34 is a spring finger 38, extending upwardly from bar 34, the upper end 36 of finger 34 being turned outwardly as shown. Bar 34 extends outwardly from the lower edge of rib 32, at the center thereof. Rib 32, bar 34 and finger 38 are preferably formed, as by stamping or otherwise from a single blank of springy material. When viewed along a central transverse sectional line, as in Figure 2, the clip of the present invention is generally U-shaped, one leg consisting of rib 32 and the other leg consisting of finger 38, connected by bridge bar 34.

When it is desired to clip together the engagement ring 12 and the wedding ring 20, rib 32 is inserted into the elongated opening 24 on the underside of gem setting 22 on the engagement ring 20. As seen in Figures 2 and 3, rib 32 is transversely curved outwardly, away from finger 38, as indicated at 50. In the modification of Figure 4, rib 32 is transversely curved inwardly, towards finger 38, as indicated at 52. This curvature provides a gripping engagement between rib 32 and the gem mount 22. When the curved rib 32 is inserted into opening 24, it must be straightened against its normal curvature. On being positioned as in Figures 2 and 3, the tendency of the curved rib 32, to return to its normal condition, will exert a gripping pressure against the sides of the opening. This will be true whether rib 32 is curved inwardly, as at 50, or outwardly, as at 52, and the condition will prevail if the sides of opening 24 are straight or curved as shown, provided the curvature of rib 32 is such that the ends of the rib are spaced laterally from the center thereof a distance greater than the width of opening 24.

With rib 32 positioned in ring 20 as above described, the other ring 12 of the pair is then fitted onto the finger 38. This is done by inserting the finger terminal 36 into the opening 16, from the underside of gem setting 14, and pressing the clip inwardly until the lower edge 54 of setting 14 bears against bar 34 (see Figure 2). My clip 30 is so proportioned that finger 38 must be pressed outwardly a bit to fit the rings between the legs of the U-clip, finger 38 thus exerting a spring pressure to hold the rings together. Used as above indicated, my clip will be out of sight when in position. The thickness of bridge bar 34 will not be bothersome on the finger, and the clip cannot be disengaged except when the rings are removed from the finger.

Having now described my invention, what I claim and desire to secure by Letters Patent is:

1. A spring clip for holding together a wedding ring and an engagement ring, both of which rings have sockets opening on the underside thereof at the tops thereof, which clip comprises a substantially U-shaped member, one leg of which U-member is relatively narrow and extends upwardly therefrom, is arched inwardly and is adapted to fit into the socket of the engagement ring, the other leg of which U-member is shorter and wider than the one leg, and extends a substantial distance beyond each side of the one leg, and is adapted to fit into the socket of the wedding ring whereby to grip the rings between the U-legs and urge same towards each other.

2. A spring clip as in claim 1 in which the first leg is longer than the second, and the second leg is curved longitudinally and downwardly.

HYMAN SEIDMAN.

REFERENCES CITED

The following references are of record in the file of this patent:

UNITED STATES PATENTS

| Number | Name | Date |
|---|---|---|
| 1,224,762 | McKeown | May 1, 1917 |
| 1,265,679 | Krope | May 7, 1918 |
| 2,298,901 | Pickering | Oct. 13, 1942 |
| 2,428,338 | Poupitch | Sept. 30, 1947 |